US006125588A

United States Patent [19]

Schultz

[11] Patent Number: 6,125,588

[45] Date of Patent: Oct. 3, 2000

[54] GLASS ATTACHMENT SYSTEM FOR WINDOW REGULATOR SYSTEMS

[75] Inventor: Theodore L. Schultz, Novi, Mich.

[73] Assignee: DaimlerChrysler Corporation, Auburn Hills, Mich.

[21] Appl. No.: 09/426,301

[22] Filed: Oct. 25, 1999

[51] Int. Cl.[7] .......... B60J 1/16

[52] U.S. Cl. .......... 49/375; 49/358

[58] Field of Search .......... 49/375, 374, 358, 49/352; 52/204.591, 204.62, 204.71; 411/522, 508, 520; 248/473, 474; 24/656

[56] References Cited

U.S. PATENT DOCUMENTS

| | | | |
|---|---|---|---|
| 2,236,449 | 3/1941 | Roethel | 49/375 |
| 3,061,363 | 10/1962 | Martinez . | |
| 3,787,922 | 1/1974 | Foy et al. | 248/473 |
| 4,026,088 | 5/1977 | Akabane . | |
| 4,449,326 | 5/1984 | Hori et al. . | |
| 4,597,223 | 7/1986 | Shiraishi et al. . | |
| 4,663,901 | 5/1987 | Ichinohe . | |
| 4,762,904 | 8/1988 | Nakama . | |
| 4,910,917 | 3/1990 | Brauer . | |
| 4,986,030 | 1/1991 | Bertolini et al. . | |
| 4,991,351 | 2/1991 | Bertolini . | |
| 5,038,519 | 8/1991 | Huebner . | |
| 5,469,662 | 11/1995 | TenBrink et al. . | |
| 5,469,663 | 11/1995 | TenBrink et al. . | |
| 5,513,468 | 5/1996 | Diestelmeier . | |
| 5,515,651 | 5/1996 | Hofmann et al. . | |
| 5,546,704 | 8/1996 | Maruoka . | |
| 5,664,749 | 9/1997 | Kump et al. | 248/473 |
| 5,673,515 | 10/1997 | Weber et al. . | |
| 5,694,719 | 12/1997 | Bejune et al. . | |
| 5,704,100 | 1/1998 | Swan | 24/656 |
| 5,765,310 | 6/1998 | Gold . | |
| 5,778,599 | 7/1998 | Saito . | |
| 5,848,496 | 12/1998 | Bertolini et al. . | |
| 5,907,927 | 6/1999 | Lieb et al. | 49/375 |
| 5,966,872 | 10/1999 | Wasek | 49/375 |
| 5,987,820 | 11/1999 | Shibanushi | 49/375 |
| 5,992,099 | 11/1999 | Thomas | 49/375 |

*Primary Examiner*—Daniel P. Stodola
*Assistant Examiner*—Curtis A. Cohen
*Attorney, Agent, or Firm*—Marc Lorelli

[57] ABSTRACT

An attachment system for coupling a vehicle window to a window regulator. The attachment system includes a mounting bracket, a housing, a first securing structure and a second securing structure. The mounting bracket includes a clip structure adapted for coupling to the vehicle window. The mounting bracket also includes a pin member which is inserted into a pin aperture in the housing. The first securing structure is coupled to the housing and to the pin member and prevents withdrawal of the pin member from the pin aperture. The pin member extends through the pin aperture and into a central cavity where it engages the second securing member. The second securing member is slidably positionable in the central cavity and is operable for inhibiting the movement of the pin member relative to the housing along a predetermined axis.

22 Claims, 10 Drawing Sheets

Fig-4
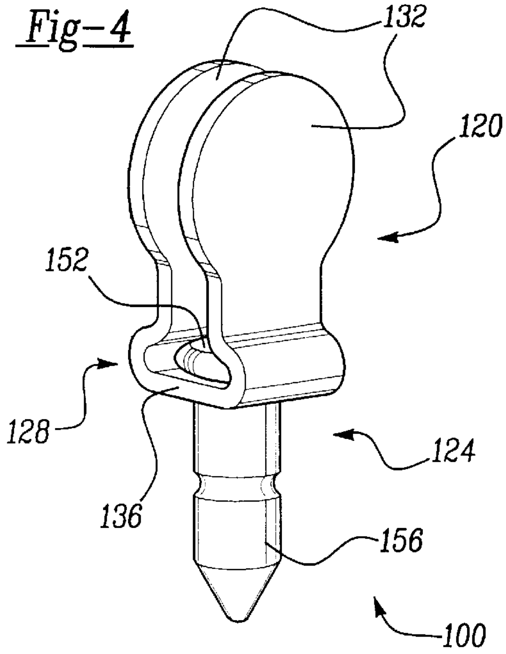
Fig-5
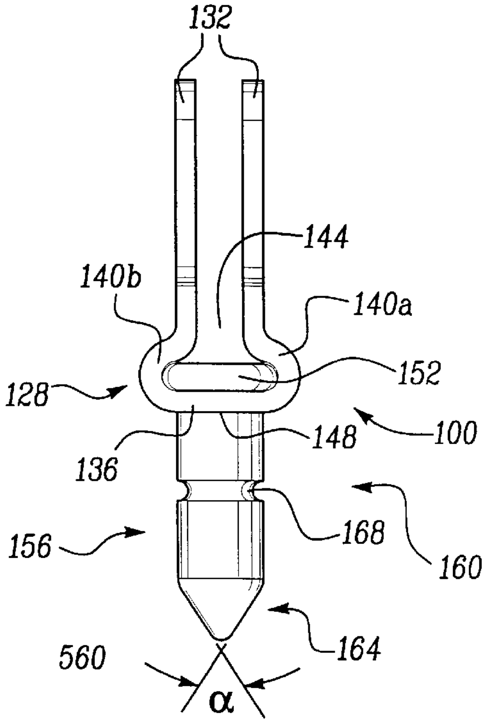
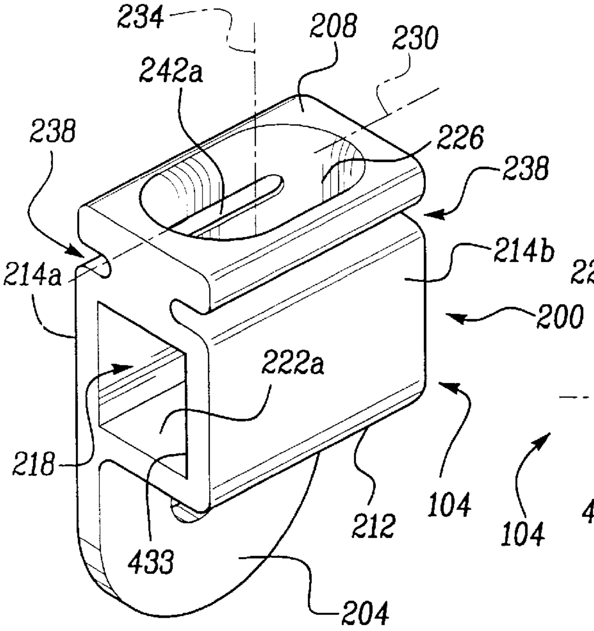
Fig-6
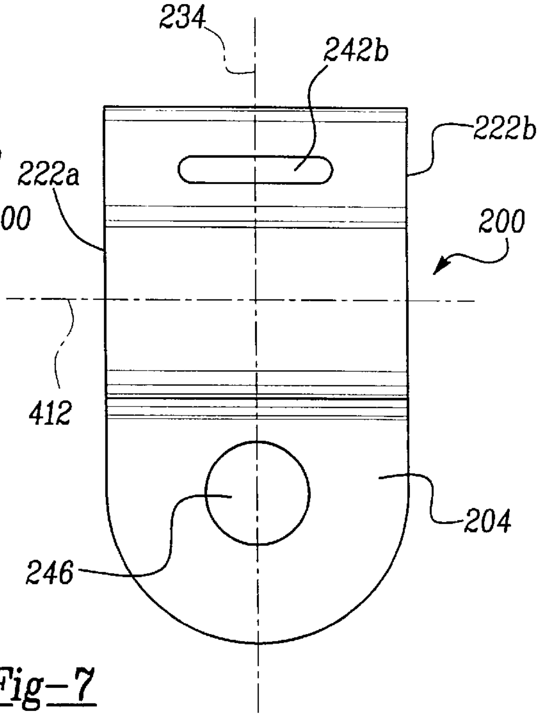
Fig-7

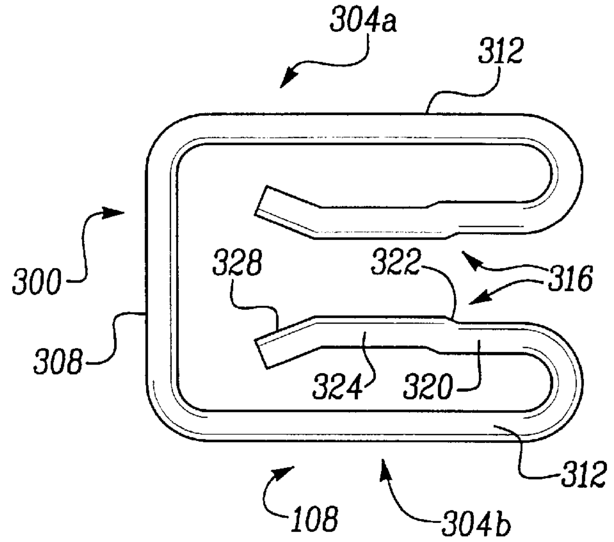
Fig-8
Fig-9
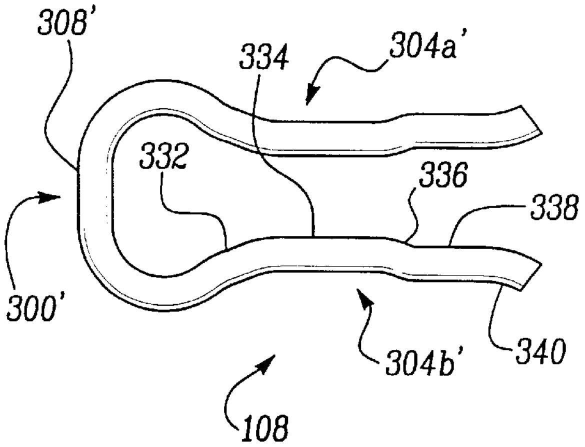
Fig-10
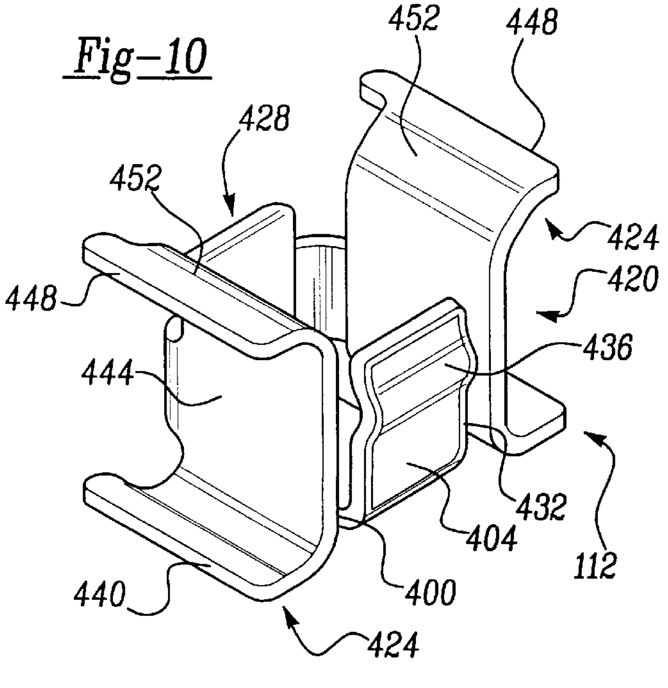

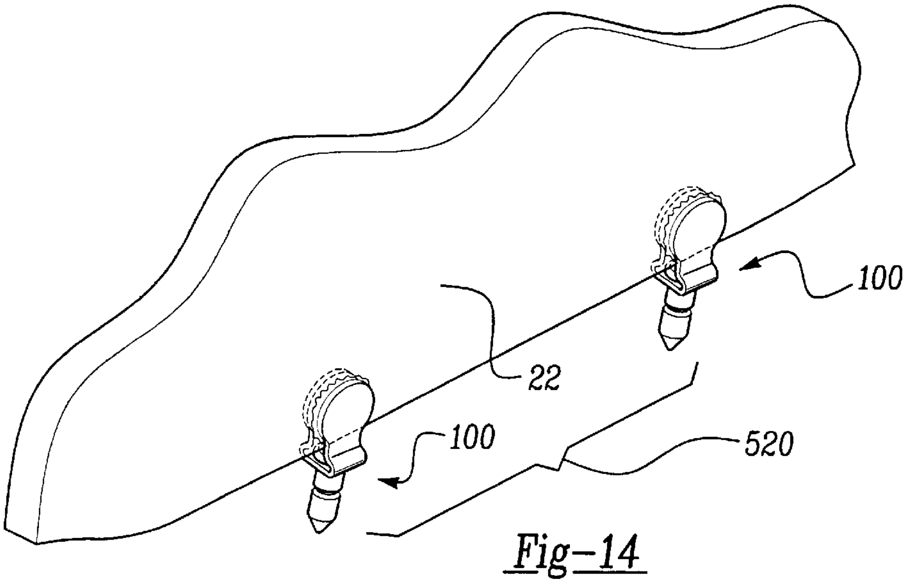
Fig-14
Fig-15
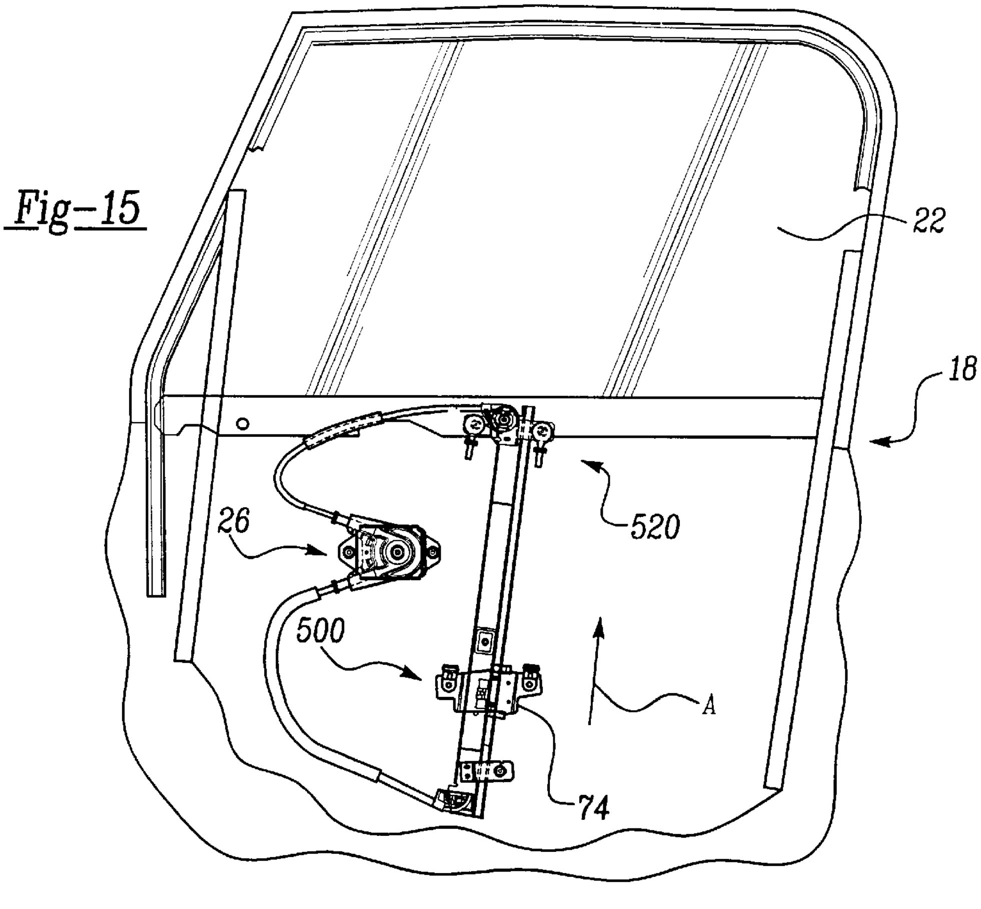

Fig-18
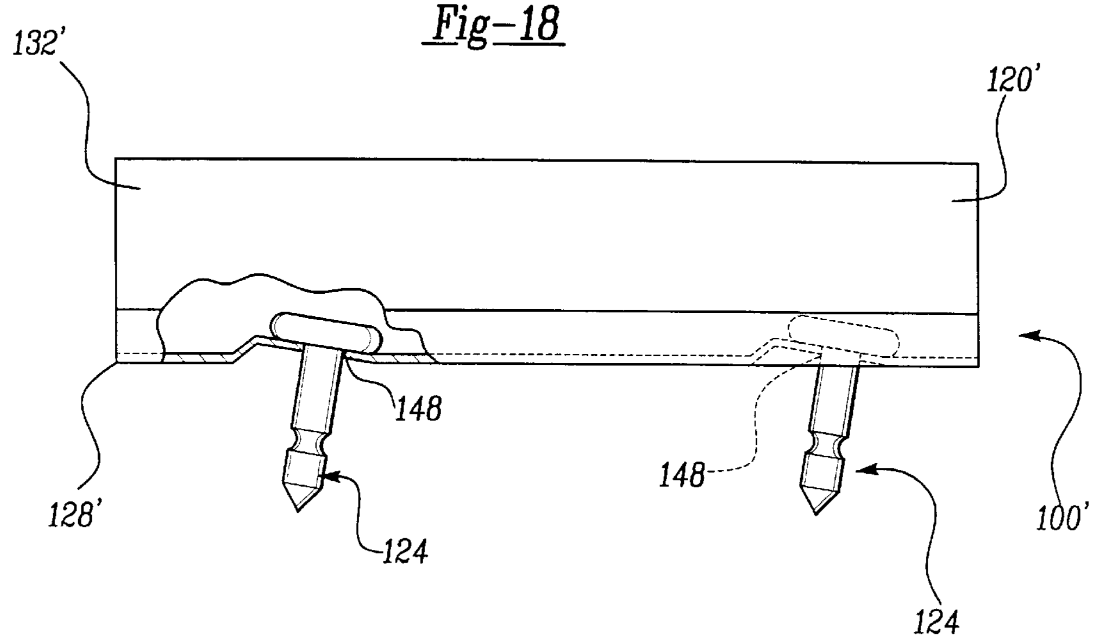
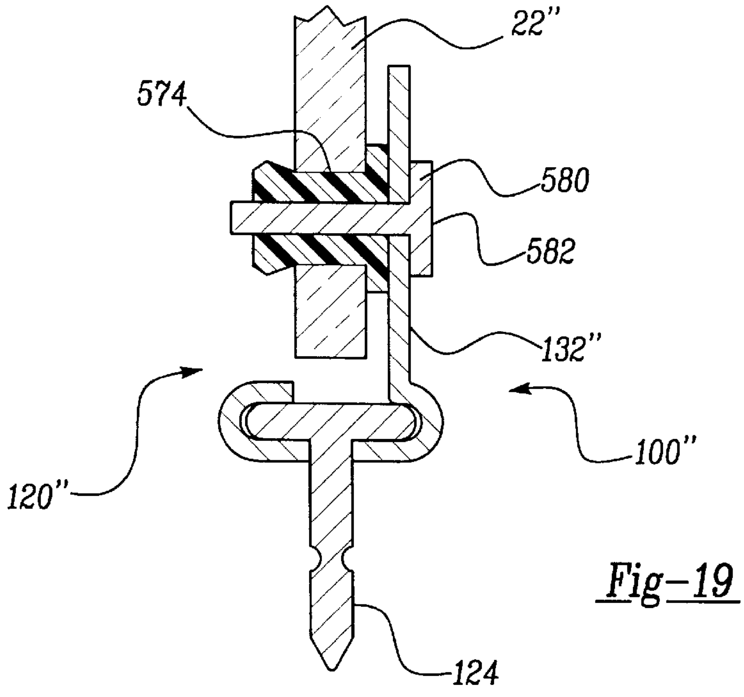
Fig-19

GLASS ATTACHMENT SYSTEM FOR WINDOW REGULATOR SYSTEMS

BACKGROUND OF THE INVENTION

1. Technical Field

The present invention relates generally to vehicle window systems and more particularly to an attachment system for coupling a vehicle window to a window regulator.

2. Discussion

The methods and devices for attaching vehicle windows to various window regulator systems vary widely due to differences in the configuration of the vehicle body, the amount of support which the window regulator must provide the vehicle window and the need to access the components of the window-to-regulator attaching system to install or adjust the vehicle window and/or attaching hardware. Most methods for installing vehicle windows attach the vehicle window to the window regulator when the window is in a lowered position, typically in a range between a fully down position and a three-quarters down position. While this position permits the assembly technician to easily access the window regulator, the vehicle window and the components of the attachment system, several drawbacks have been noted.

One such drawback is that this range of positions does not typically align the vehicle window to the window guide channels due to vehicle-to-vehicle variation. Improperly aligned vehicle windows typically cause excessive cranking efforts, leading to premature window regulator and window seal wear. In order to detect an improperly aligned vehicle window, the assembly technician must try-out the fit of the vehicle window to the window guide channels by raising the vehicle window into the fully up position.

If an improperly aligned vehicle window is detected and a decision is made to attempt to adjust the vehicle window within acceptable tolerances, the assembly technician must lower the vehicle window to permit access to the attachment system and window regulator as the components of the attachment system are typically inaccessible when the vehicle window is in the fully up position. As such, the alignment process is highly dependent on the experience and intuition of the assembly technician to infer not only the cause of the misalignment, but also the magnitude of the adjustment that must be made. The process of aligning the vehicle window to the window guide channels frequently is made through several iterative steps and as such, can be highly labor intensive. It is worth noting that due to the iterative nature of the alignment process, the realignment process is frequently not attempted when misaligned vehicle windows are detected.

Several automatically adjustable attachment systems have been developed, but as these systems also require the vehicle window to be attached to the window regulator in a three-quarters down position, they frequently suffer from the problems associated with misalignment.

SUMMARY OF THE INVENTION

It is one object of the present invention to provide an attachment system for coupling a vehicle window to a window regulator which permits the vehicle window to be coupled to the window regulator when the vehicle window is in a fully raised position.

It is another object of the present invention to provide an attachment system for coupling a vehicle window to a window regulator which adjusts for the vehicle-to-vehicle variation in a predetermined direction to improve the alignment between the vehicle window and the window guide channels.

It is a further object of the present invention to provide an attachment system for coupling a vehicle window to a window regulator which may be installed and serviced in a quick and efficient manner.

An attachment system for coupling a vehicle window to a window regulator is provided. The attachment system includes a mounting bracket, a housing, a first securing structure and a second securing structure. The mounting bracket includes a clip structure adapted for coupling to the vehicle window. The mounting bracket also includes a pin member which is inserted into a pin aperture in the housing. The first securing structure is coupled to the housing and to the pin member and prevents withdrawal of the pin member from the pin aperture. The pin member extends through the pin aperture and into a central cavity where it engages the second securing member. The second securing member is slidably positionable in the central cavity and is operable for inhibiting the movement of the pin member relative to the housing along a predetermined axis.

Additional advantages and features of the present invention will become apparent from the subsequent description and the appended claims, taken in conjunction with the accompanying drawings.

BRIEF DESCRIPTION OF THE DRAWINGS

FIG. 4 is an enlarged perspective view of the mounting bracket illustrated in FIG. 2;

FIG. 5 is a front view of the mounting bracket of FIG. 4;

FIG. 6 is an enlarged perspective view of the housing illustrated in FIG. 2;

FIG. 7 is a side view of the housing of FIG. 6;

FIG. 8 is a top view of the clip illustrated in FIG. 2;

FIG. 9 is a top view of a clip according to another preferred embodiment of the present invention;

FIG. 10 is an enlarged perspective view of the slider illustrated in FIG. 2;

FIG. 14 is an enlarged perspective view of the window illustrated in FIG. 1;

FIG. 15 is a side view similar to that of FIG. 1 but illustrating the vehicle window and window regulator in an uncoupled condition;

FIG. 18 is a mounting bracket constructed according to another preferred embodiment of the present invention; and FIG. 19 is a cross-sectional view of a mounting bracket constructed according to yet another preferred embodiment of the present invention.

DETAILED DESCRIPTION OF THE PREFERRED EMBODIMENT

Figure 1:
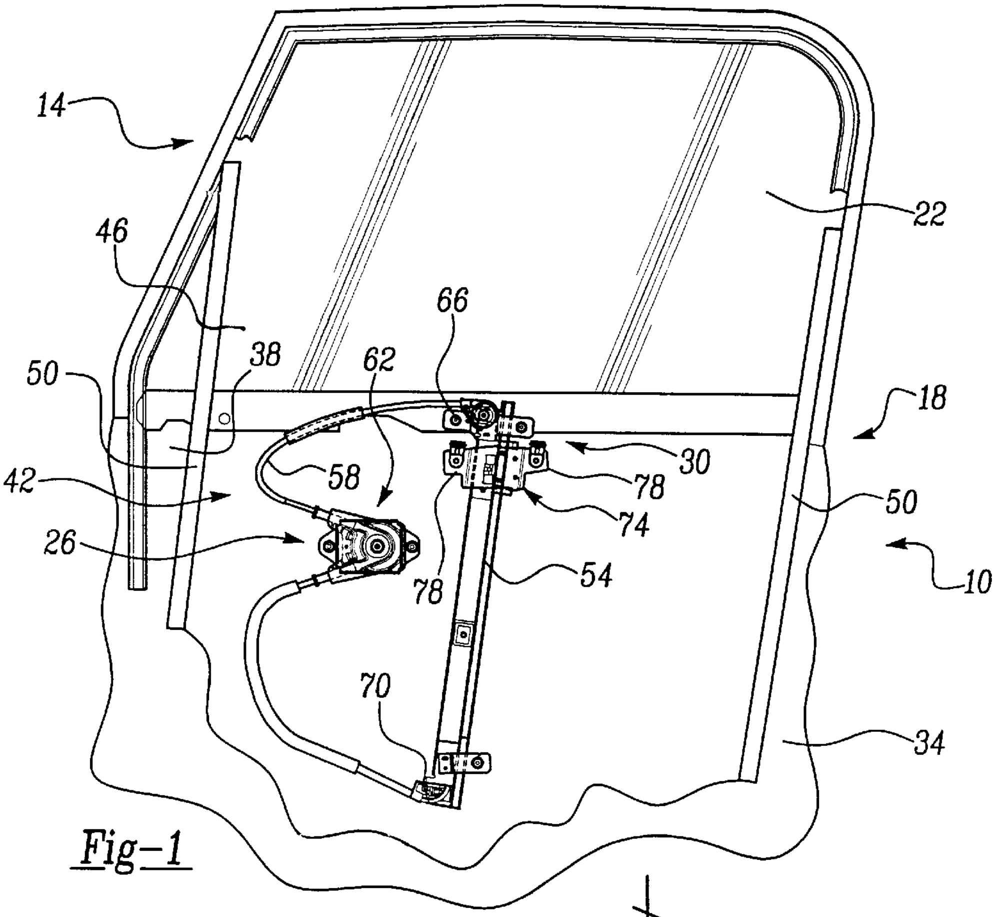
FIG. 1 is a side view of a portion of a vehicle constructed in accordance with the teachings of the present invention.

With reference to FIG. 1 of the drawings, a vehicle constructed in accordance with the teachings of the present invention is generally indicated by reference numeral 10. Vehicle 10 includes a vehicle body 14 having a door assembly 18, a vehicle window 22, a window regulator 26 and an attachment system 30. Door assembly 18 includes an inner panel 34 and an outer panel 38 spaced apart therefrom which collectively form a conventional window storage cavity 42. Outer panel 38 defines a window aperture 46 and a pair of U-shaped window guide channels 50 which extend along the lateral sides of window aperture 46 in a generally vertical direction.

Vehicle window 22 is conventionally formed and is slidingly disposed within the pair of window guide channels 50. Vehicle window is operable between a lowered position, whereby vehicle window 22 substantially clears window aperture 46, and a raised position, whereby vehicle window 22 substantially closes window aperture 46.

Although window regulator 26 is illustrated as a cable-and-drum type window regulator, it will be understood that the teachings of the present invention have applicability to other types of window regulators and as such, will not be limited in application to vehicles having cable-and-drum type window regulators. Window regulator 26 includes a main rail 54, a cable assembly 58, a drum housing assembly 62, upper pulley 66 and lower guide 70 and a lift plate 74.

Main rail 54 has a generally C-shaped cross-section and is fixedly coupled to inner panel 34 in a conventional manner. Upper pulley 66 is rotatably coupled to main rail 54 in a conventional manner. Lower guide 70 is fixedly coupled to main rail 54 in a conventional manner. Cable assembly 58 is festooned through main rail 54 and around upper pulley 66 and lower guide 70, coupling drum housing assembly 62 to lift plate 74.

Lift plate 74 is in sliding engagement with main rail 54 and as such, main rail 54 is operable for stabilizing lift plate 74 as it is moved along the length of main rail 54. Lift plate 74 includes a pair of mounting apertures 78 which will be discussed in further detail below.

Drum housing assembly 62 is also fixedly coupled to inner panel 34 in a conventional manner. Drum housing assembly 62 includes a conventional drum (not shown) which is coupled to cable assembly 58 and operable for moving the cable of the cable assembly 58 about upper and lower pulleys 66 and 70 to slidingly move lift plate 74 along main rail 54. The drum may be coupled to a handle mechanism (not shown) which permits the drum to be manually rotated, or may be coupled to an electric motor and switch to permit the drum to be automatically rotated.

Figure 2:
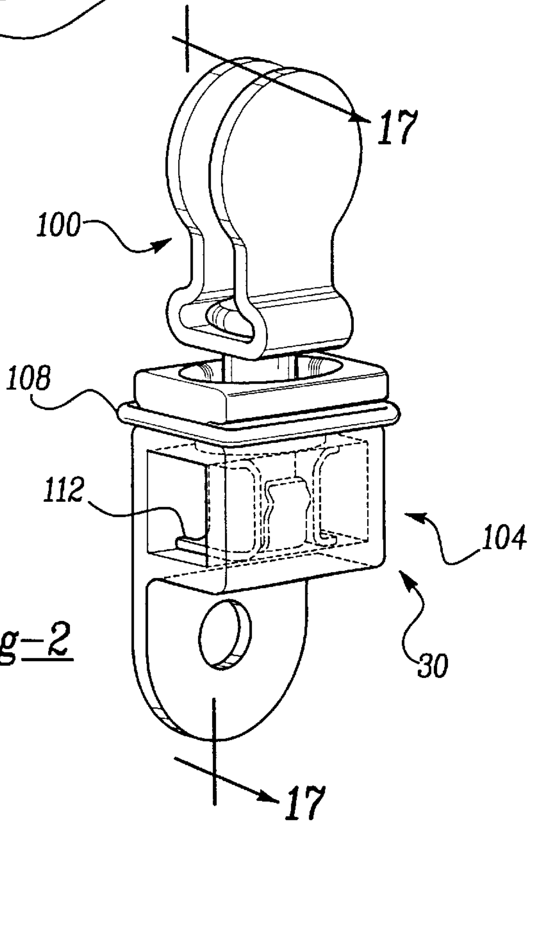
FIG. 2 is a perspective view of an attachment system constructed in accordance with a preferred embodiment of the present invention.
Figure 3:
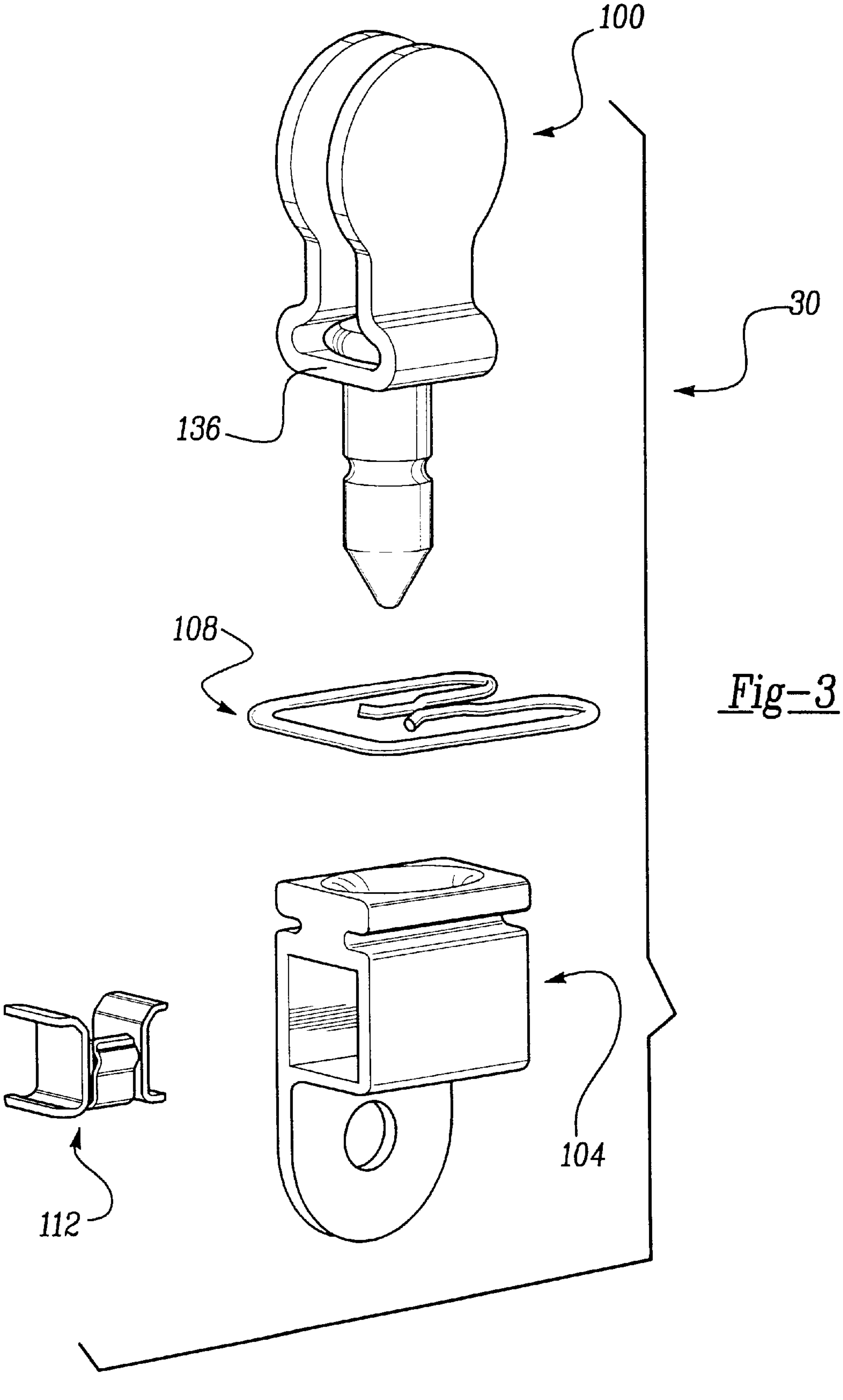
FIG. 3 is an exploded perspective view of the attachment system of FIG. 2.

In FIGS. 2 and 3, attachment system 30 is shown to include a mounting bracket 100, a housing 104, a first securing structure 108 and a second securing structure 112. With additional reference to FIGS. 4 and 5, mounting bracket 100 is shown to include a clip structure 120 and a pin member 124 coupled thereto.

Clip structure 120 includes a base structure 128 and two spaced apart furcations 132. The base structure 128 includes a generally horizontal base portion 136 and first and second end portions 140*a* and 140*b*, respectively. Each of the first and second end portions 140*a* and 140*b* is coupled to base portion 136 at a first end and to one of the two spaced apart furcations 132 at a distal end. Base portion 136 and first and second end portions 140*a* and 140*b* cooperate to form a securing member cavity 144 which will be discussed in further detail below. Base portion 136 includes a body aperture 148. Each of the two spaced apart furcations 132 extend generally vertically upward from base portion 136. The spaced apart furcations 132 are spaced apart a distance approximately equal to the thickness of vehicle window 22. In the particular embodiment illustrated, furcations 132 are adapted to be coupled to vehicle window 22 through a conventional adhesive material.

Pin member 124 includes a securing portion 152 and a body portion 156. Securing portion 152 is disposed within securing member cavity 144 and couples base structure 128 to body portion 156. In the particular embodiment illustrated, base portion 136 and first and second end portions 140*a* and 140*b* confine securing portion 152 within securing member cavity 144 and inhibit the separation of pin member 124 and clip structure 120. Alternatively, pin member 124 and clip structure 120 may be unitarily formed or coupled together through a conventional joining process such as welding, adhesives or mechanical fasteners including rivets, bolts and screws.

Body portion 156 is fixedly coupled to securing portion 152 and extends axially therefrom at a first end and through body aperture 148. Body portion 156 includes a retaining portion 160 and an insertion portion 164. The retaining portion 160 is spaced axially apart from securing portion 152 and is adapted to releasably engage first securing structure 108. In the particular embodiment illustrated, retaining portion 160 is a toroidal groove 168 formed into at least a portion of the perimeter of body portion 156. Insertion portion 164 is spaced axially apart from securing portion 152 and retaining portion 160 and is shown to be generally conical in shape. Insertion portion 164 will be discussed in greater detail below.

In FIGS. 6 and 7, housing 104 is shown to include a body portion 200 and a mounting portion 204. Housing 104 is preferably unitarily formed from an injection or transfer molded plastic material or an extruded material such aluminum.

Body portion 200 includes a top wall 208, a bottom wall 212 and a pair of side walls 214*a*, 214*b* which are coupled together to form a container-like structure having a central cavity 218 and a pair of open ends 222*a*, 222*b*. In the particular embodiment illustrated, central cavity 218 is rectangular in cross-section and extends through body portion 200.

A pin aperture 226 is formed in top wall 208 and extends axially downward therefrom into housing portion 200 and intersecting central cavity 218. In the particular embodiment illustrated, pin aperture 226 is slotted, having a major axis 230 and a central vertical axis 234. The width of pin aperture 226, taken along an axis perpendicular to major axis 230, is less than the width of central cavity 218. A U-shaped groove 238 is formed into each side wall 214*a*, 214*b*. Each of the U-shaped grooves 238 are parallel to major axis 230 and extend inwardly toward central vertical axis 234 and intersecting pin aperture 226 to form retaining apertures 242*a*, 242*b*.

Mounting portion 204 is fixedly coupled to body portion 200, extending vertically downwardly from sidewall 214*a*. Mounting portion 204 includes a mounting aperture 246 which is adapted to receive a conventional fastener to facilitate the coupling of housing 104 to lift plate 74.

In FIG. 8, first securing structure 108 is illustrated as a spring clip 300 formed from a spring wire material having a circular cross-section. Spring clip 300 is generally U-shaped and includes a pair of fork members 304*a*, 304*b* which are coupled to opposite ends of a base member 308. In the particular embodiment illustrated, each of the fork members 304 includes an outer portion 312 and an inner portion 316. Outer portion 312 couples base member 308 to inner portion 316. Outer portion 312 extends away from base member 308 in a direction generally perpendicular thereto. Inner portion 316 is spaced inwardly of outer portion 312 and extends toward base member 308 in a direction generally perpendicular thereto.

Each inner portion 316 is shown to include a first longitudinally extending portion 320, a first transition portion 322, a second longitudinally extending portion 324, and a second transition portion 328. The distance between the first longitudinally extending portions 320 is greater than the distance across housing 104 as measured at the roots of the U-shaped grooves 238. The distance between the second longitudinally extending portions 324 is less than the distance across housing 104 as measured at the roots of the U-shaped grooves 238. The diameter of each of the second longitudinally extending portions 324 is smaller than the width of retaining apertures 242*a*, 242*b*. First transition portion 322 couples first and second longitudinally extending portions 320 and 324 together. Each of the second transition portions 328 flares outwardly of its respective second longitudinally extending portion 324 and toward base member 308. The construction of fork members 304 enables the inner portions 316 to exert an inwardly directed force through the second longitudinally extending portions 324 which resists the outward splaying of the inner portions 316 which is relatively constant along the entire length of the second longitudinally extending portions 324.

In FIG. 9, an alternate construction of the spring clip is illustrated. Spring clip 300' is shown to include a base member 308' and a pair of fork members 304*a*', 304*b*'. Fork members 304' are shown to include a first transition portion 332, a first longitudinally extending portion 334, a second transition portion 336, a second longitudinally extending portion 338, and a third transition portion 340.

First transition portion 332 couples base member 308' to first longitudinally extending portion 334. The distance between the first longitudinally extending portions 334 is less than the distance across housing 104 as measured at the roots of the U-shaped grooves 238. The diameter of each of the first longitudinally extending portions 334 is smaller than the width of retaining apertures 242*a*, 242*b*. The distance between the second longitudinally extending portions 338 is greater than the distance across housing 104 as measured at the roots of the U-shaped grooves 238. Second transition portion 336 couples first and second longitudinally extending portions 332 and 338 together. Each third transition portion 340 flares outwardly of its respective second longitudinally extending portion 338. The construction of fork members 304' enables the first longitudinally extending portions 334 to exert an inwardly directed force which resists the outward splaying of the fork members 304' which tends to diminish in magnitude as the distance from base member 308' increases.

Figure 11:
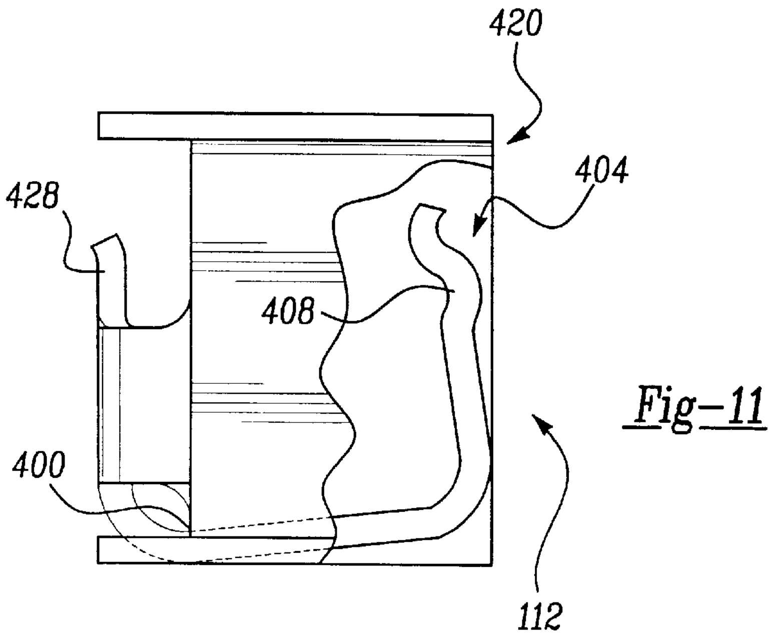
FIG. 11 is a front view of the slider of FIG. 10.

In FIGS. 10 and 11, second securing structure 112 is illustrated as being a stamped sheet metal fabrication formed from a spring steel material. Second securing structure includes a base member 400 and a securing member 404. Base member 400 is generally flat and horizontal. Securing member 404 is coupled to base member 400 and extends generally vertically upward therefrom. Securing member 404 includes a spring portion 408 which is resiliently biased inwardly toward base portion 400. Second securing structure

112 is at least partially disposed in central cavity 218. Second securing structure 112 is also sized so as to be slidably positionable within central cavity 218 along a predetermined axis 412 (see FIG. 7).

In the particular embodiment illustrated, second securing member 112 is a spring-like structure 420 which includes a pair of lateral walls 424 and a rear wall 428 in addition to base member 400 and securing member 404. Securing member 404 is shown to include a burr 432 created by the stamping process in which second securing structure 112 was formed. Burr 432 is on the outwardly facing portion 436 of securing member 404.

Rear wall 428 is spaced apart from securing member 404 and is coupled to base member 400, extending generally vertically upward therefrom. Each of the lateral walls 424 is coupled to an opposite side of rear wall 428. Each lateral wall 424 includes a lower portion 440, an intermediate portion 444 and an upper portion 448. Intermediate portion 444 is coupled to rear wall 428 and extends generally perpendicular therefrom. Lower portion 440 is coupled to a first end of intermediate portion 444 and extends generally perpendicular thereto in a direction away from base member 400. Upper portion 448 is coupled to a distal end of intermediate portion 444 and extends generally perpendicular thereto in a direction away from base member 400. Upper portion 448 includes an arcuate guide surface 452 which will be discussed in further detail, below. The distance between lateral walls 424 is approximately equal to the diameter of body portion 156. The distance between rear wall 428 and securing member 404 is less than the diameter of body portion 156 when securing member 112 is in a free state.

Figure 13:
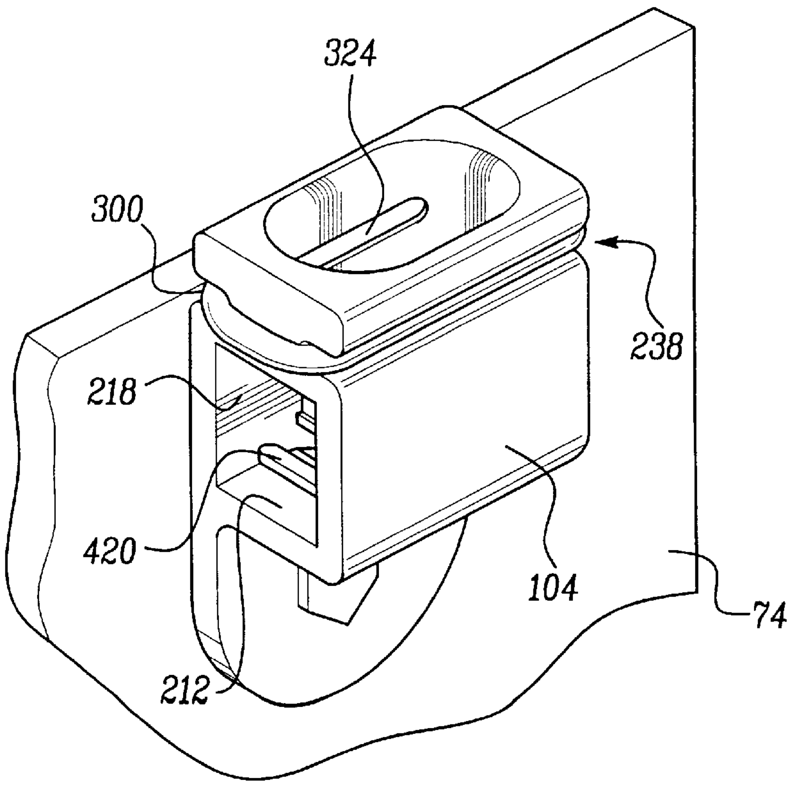
FIG. 13 is an enlarged perspective view of a portion of the regulator of FIG. 12.
Figure 12:
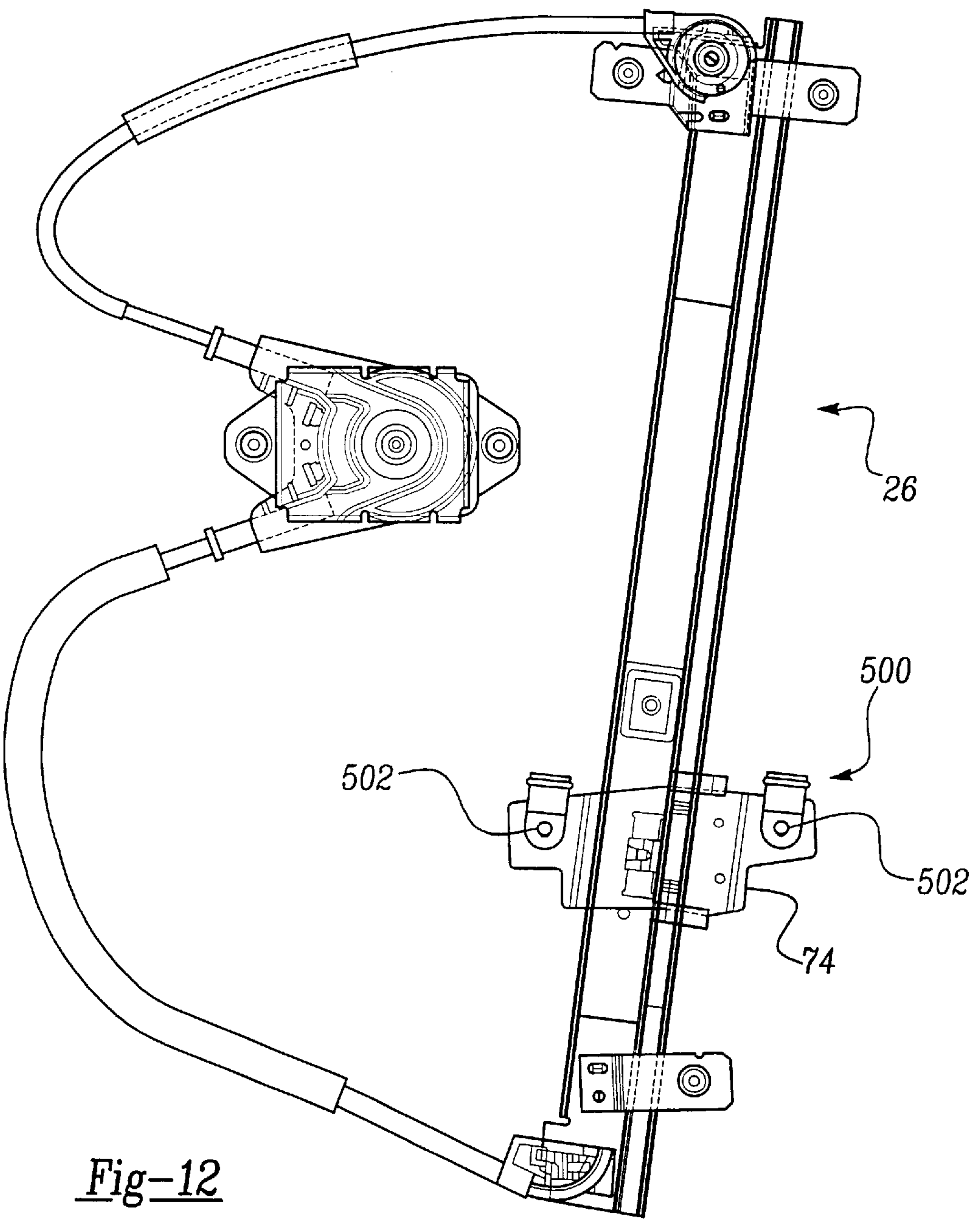
FIG. 12 is a side view of the regulator illustrated in FIG. 1.

In FIGS. 12 and 13, a first portion 500 of mounting system 30 is assembled to window regulator 26. First portion 500 includes two sets of housings 104, spring clips 300 and spring-like structures 420. Fasteners 502 are placed through the pair of mounting apertures 78 in glide member 74 and through the mounting apertures 246 in housings 104. A spring-like structure 420 is inserted into each of the central cavities 218 such that base member 308 is in contact with the inner surface of the bottom wall 212. A spring clip 300 is then inserted into the U-shaped grooves 238 in the housing 104 and each of the second longitudinally extending portions 324 extends through its respective retaining apertures 242. At this stage, one or both of the open ends 222*a*, 222*b* of central cavity 218 may be staked or otherwise deformed to inhibit the withdrawal of spring-like structure 420 from central cavity 218. Window regulator 26 is then installed to door assembly 18 in this condition.

In FIG. 14, a second portion 520 of mounting system 30 is assembled to vehicle window 22. Second portion 520 includes two sets of mounting brackets 100. Preferably, the mounting brackets 100 and vehicle window 22 are placed in an assembly fixture (not shown). The assembly fixture is operable for maintaining the proper spatial relationship between the mounting brackets 100 and vehicle window 22. A urethane adhesive is applied to the vehicle window 22 and/or the furcations 132. The assembly fixture is then actuated to slide the furcations 132 over the vehicle window 22 and permit the furcations 132 to adhesively bond to the vehicle window 22 at predetermined locations.

Figure 16:
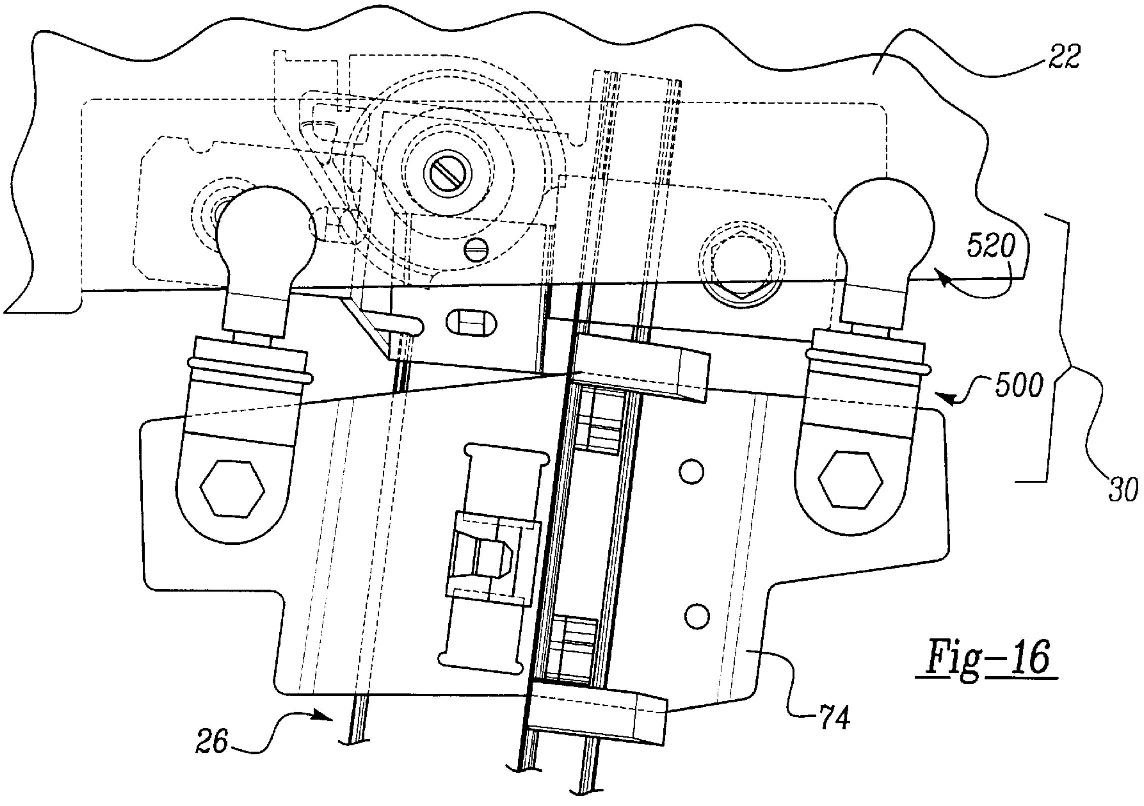
FIG. 16 is an enlarged view of a portion of the vehicle of FIG. 1.

In FIG. 15, the assembly procedure is illustrated to permit the vehicle window 22 to be temporarily coupled to the door assembly 18 in a fully raised position through appropriate assembly tooling, such as a padded clamp (not shown). The window regulator 26 is then actuated to cause glide member 74 to move in the direction of arrow A until the first and second portions 500 and 520 of attachment system 30 are operatively engaged as shown in FIG. 16.

Figure 17:
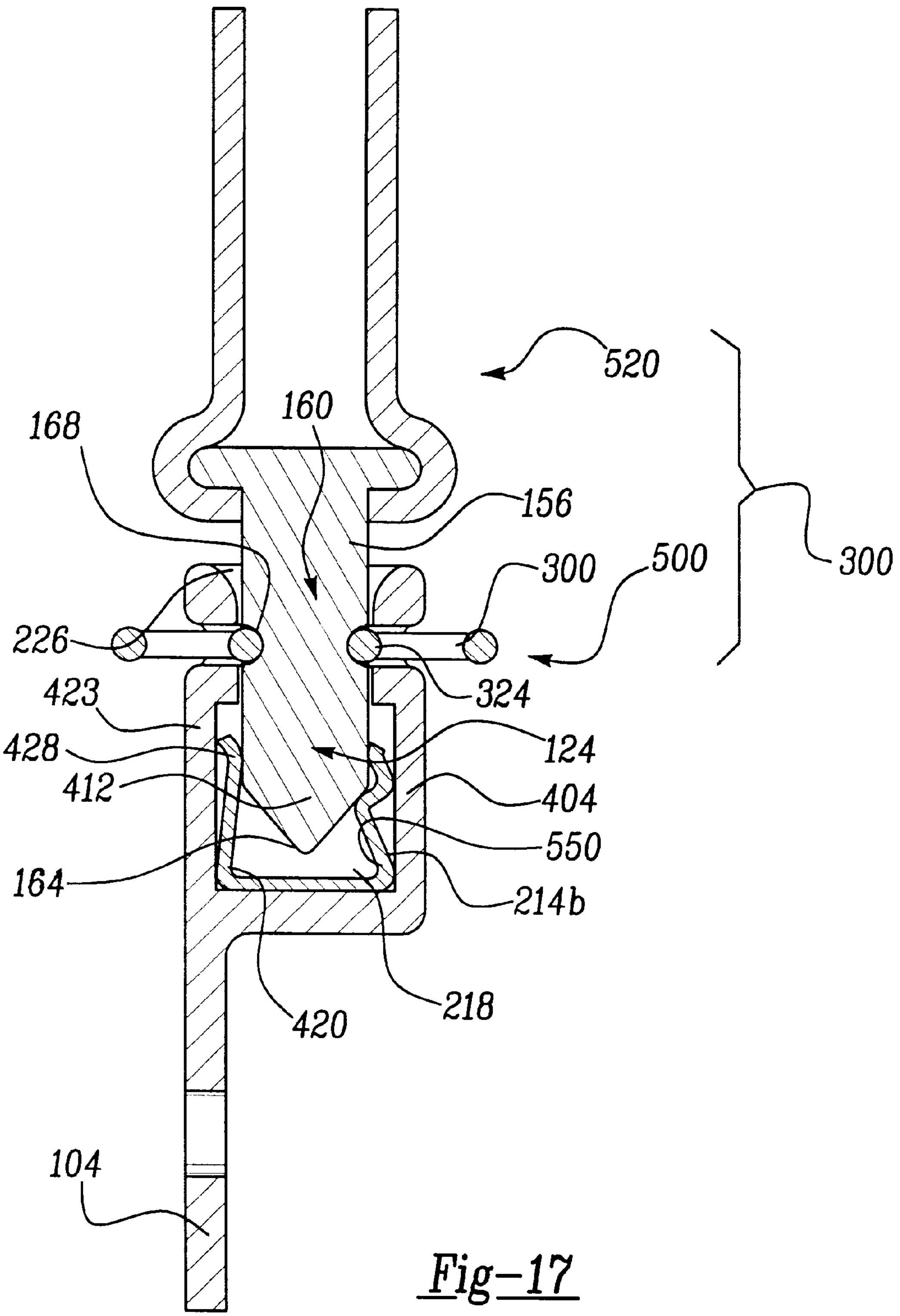
FIG. 17 is a cross-sectional front view of a portion of the vehicle of FIG. 1.

In FIG. 17, the first and second portions 500 and 520 of attachment system 30 are shown in cross-section as operatively engaged. The body portion 156 of pin member 124 is shown to extend through pin aperture 226 into central cavity 218. Insertion of pin member 124 into pin aperture 226 causes insertion portion 164 to contact spring clip 300. In response thereto, each of the second longitudinally extending portions 324 spread in an outward direction around body portion 156. Further insertion of pin member 124 into second portion 500 causes pin member 124 to contact spring-like structure 420. Depending upon the alignment of pin member 124 and spring-like structure 420, insertion portion 164 will first contact one of the arcuate guide surfaces 452, causing the spring-like structure 420 to slide within central cavity 218 along predetermined axis 412 until spring-like structure 420 and pin member 124 are sufficiently aligned.

Further insertion of body portion 156 into pin aperture 226 causes insertion portion 164 to contact rear wall 428 and securing member 404, causing securing member 404 to bend outwardly toward and eventually contact the inner surface 550 of side wall 214*b*.

Still further insertion of body portion 156 into pin aperture 226 aligns retaining portion 160 with retaining apertures 242, thereby permitting the second longitudinally extending portions 324 to move inwardly and engage toroidal groove 168. Preferably, toroidal groove 168 is only deep enough to permit engagement with about two-thirds of the diameter of the material forming each of the second longitudinally extending portions 324. Construction in this manner ensures that the pin member 124 will not draw spring clip 300 into pin aperture 226 during the operation of window regulator 26. Engagement of spring clip 300 into toroidal groove 168 constitutes fully insertion of the pin member 124 into central cavity 218.

With additional reference to FIGS. 7 and 10, once body portion 156 has been fully inserted into central cavity 218, securing member 404 is operable for exerting a force on pin member 124 and housing 104 which inhibits movement of pin member 124 in pin aperture 226 along the predetermined axis 412. The burr 432 on the securing member 404 lodges into the interior surface 433 of side wall 214*b*, further inhibiting relative movement between securing member 404 and housing 104. As those skilled in the art will appreciate, the angle 560 of insertion portion 164 (shown in FIG. 5) may be altered to permit body portion 156 to be inserted into central cavity 218 with a desired force.

Disassembly of mounting system 30 to permit window regulator 26 or vehicle window 22 to be serviced and/or replaced is performed by lowering the vehicle window 22 and removing spring clip 300 from housing 104.

While the mounting system of the present invention has been described thus far as having a pair of mounting brackets which are adhesively coupled to a vehicle window, those skilled in the art will appreciate that the invention, in its broader aspects, may be constructed somewhat differently. For example, the mounting bracket may be unitarily formed as shown in FIG. 18.

In this arrangement, mounting bracket 100' is shown to include a clip structure 120' and a pair of pin members 124. Clip structure 120' includes a base structure 128' and two spaced apart furcations 132' which are substantially similar to base structure 128 and furcations 132, respectively, except that base structure 128' includes two body apertures 148. This configuration is advantageous as the spacing between the pin members 124 need not be controlled during the assembly of mounting bracket 100' to vehicle window 22.

As another example, the furcation may be coupled to the vehicle window in a manner similar to that shown in FIG. 19. In this arrangement, fastener apertures 570 and 574 extend through the furcation 132" and the vehicle window 22", respectively. A conventional expanding anchor 580 extends through clip structure 120" and vehicle window 22". A threaded fastener 582 is threadably engaged to expanding anchor 580, causing the distal side of expanding anchor 580 to expand and fixedly couple mounting bracket 100" to vehicle window 22".

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the description of the appended claims.

I claim:

1. A window mounting bracket for mounting a vehicle window to a window regulating mechanism, the window mounting bracket comprising:

a rigid clip structure having a generally horizontal base structure and two spaced apart furcations, each of the furcations being coupled at a first end to the base structure and extending generally vertically upward therefrom, at least one of the furcations having a substantially flat portion which is adapted for mounting to the vehicle window; and a pin member having a securing portion and a body portion, the securing portion being rotatably coupled to the base structure about an axis, the body portion including a retaining portion, the body portion coupled to the securing portion at a first end and extending axially vertically downward therefrom, the retaining portion axially spaced apart from the securing portion and including a groove adapted to releasably engage a clip coupled to the window regulating mechanism.

2. The window mounting bracket of claim 1, wherein the securing portion is welded to the base structure.

3. The window mounting bracket of claim 1, wherein the base structure includes a base portion and two end portions, each of the end portions coupled to the base portion at a first end and each of the end portions coupled to one of the furcations at a distal end, the base portion and the end portions cooperating to form a securing member cavity for retaining the securing portion of the pin member in a predetermined location.

4. The window mounting bracket of claim 1, wherein at least one of the furcations includes a fastener aperture adapted to receive a fastener for securing the window mounting bracket to the vehicle window.

5. An attachment system for coupling a vehicle window to a window regulating mechanism, the attachment system comprising:

a housing having a body portion and a mounting portion, the body portion having a plurality of walls including a top wall, the plurality of walls defining a central cavity and a pin aperture, the pin aperture extending through the top wall and intersecting the central cavity, the mounting portion coupled to the body portion and adapted for coupling to the window regulating mechanism;

a window mounting bracket including a clip structure and a pin member, the clip structure having a base structure and two spaced apart furcations, the base member having a generally horizontal base portion, each of the furcations coupled to the base structure and extending generally vertically upward from the base portion, the furcations adapted for mounting to the vehicle window, the pin member having a securing portion and a body portion, the securing portion coupled to the base structure, the body portion including a retaining portion, the body portion coupled to the securing portion at a first end and extending axially therefrom, the retaining portion axially spaced apart from the securing portion, the body portion extending through the pin aperture and into the central cavity;

a first securing structure coupled to the housing and engaging the retaining portion to inhibit withdrawal of the pin member from the pin aperture; and a second securing structure at least partially disposed in the central cavity, the second securing structure slidably positionable within the central cavity along a predetermined axis;

wherein insertion of the pin member into the central cavity engages the second securing structure to the body portion and the housing to inhibit movement of the pin member along the predetermined axis.

6. The attachment system of claim 5, wherein the pin aperture is slotted with a major axis parallel to the predetermined axis.

7. The attachment system of claim 5, wherein the body portion further includes at least one coupling aperture extending through at least one of the plurality of walls and intersecting the pin aperture.

8. The attachment system of claim 7, wherein the first securing structure is a clip which extends through the coupling aperture to engage the retaining portion.

9. The attachment system of claim 8, wherein the retaining portion is a groove formed into at least a portion of perimeter of the body portion.

10. The attachment system of claim 9, wherein the clip is formed in a generally U-shape from a wire material, the clip having a pair of spaced apart leg members.

11. The attachment system of claim 5, wherein the second securing structure includes a resilient engagement member, the engagement member disposed at least partially within the central cavity and toward the central longitudinal axis of the pin aperture, the engagement member operable for engaging an inner surface of one of the plurality of wall members and the body portion to inhibit relative movement between the pin member and the body portion along the predetermined axis.

12. The attachment system of claim 11, wherein the engagement member is formed in a stamping process and includes a burr, the burr operably engaging the inner surface when the engagement member contacts the pin member to inhibit relative movement between the engagement member and the inner surface.

13. The attachment system of claim 11, wherein the second securing structure further includes first and second wall members coupled to the engagement member, the first and second wall members spaced apart along the predetermined axis and operable for aligning the engagement member to the body portion.

14. A vehicle comprising:

a vehicle window;

a window regulating mechanism having a positioning member positionable along a predetermined first axis;

a housing having a body portion and a mounting portion, the body portion having a plurality of walls including a top wall, the plurality of walls defining a central cavity and a pin aperture, the pin aperture extending through the top wall and intersecting the central cavity, the mounting portion coupled to the body portion, the mounting portion coupled to the window regulating mechanism;

a window mounting bracket including a clip structure and a pin member, the clip structure having a base structure and two spaced apart furcations, the base member having a generally horizontal base portion, each of the furcations coupled to the base structure and extending generally vertically upward from the base portion, the furcations coupled to the vehicle window, the pin member having a securing portion and a body portion, the securing portion coupled to the base structure, the body portion including a retaining portion, the body portion coupled to the securing portion at a first end and extending axially therefrom, the retaining portion axially spaced apart from the securing portion, the body portion extending through the pin aperture and into the central cavity;

a first securing structure coupled to the housing and engaging the retaining portion to inhibit withdrawal of the pin member from the pin aperture; and a second securing structure at least partially disposed in the central cavity, the second securing structure slidably positionable within the central cavity along a predetermined second axis;

wherein insertion of the pin member into the central cavity engages the second securing structure to the body portion and the housing to inhibit movement of the pin member along the predetermined second axis.

15. The vehicle of claim 14, wherein the pin aperture is slotted with a major axis parallel to the predetermined second axis.

16. The vehicle of claim 14, wherein the body portion further includes at least one coupling aperture extending through at least one of the plurality of walls and intersecting the pin aperture.

17. The vehicle of claim 16, wherein the first securing structure is a clip which extends through the coupling aperture to engage the retaining portion.

18. The vehicle of claim 17, wherein the retaining portion is a groove formed into at least a portion of perimeter of the body portion.

19. The vehicle of claim 18, wherein the clip is formed in a generally U-shape from a wire material, the clip having a pair of spaced apart leg members.

20. The vehicle of claim 14, wherein the second securing structure includes a resilient engagement member, the engagement member disposed at least partially within the central cavity and toward the central longitudinal axis of the pin aperture, the engagement member operable for engaging an inner surface of one of the plurality of wall members and the body portion to inhibit relative movement between the pin member and the body portion along the predetermined second axis.

21. The vehicle of claim 20, wherein the engagement member is formed in a stamping process and includes a burr, the burr operably engaging the inner surface when the engagement member contacts the pin member to inhibit relative movement between the engagement member and the inner surface.

22. The vehicle of claim 20, wherein the second securing structure further includes first and second wall members coupled to the engagement member, the first and second wall members spaced apart along the predetermined axis and operable for aligning the engagement member to the body portion.

* * * * *